United States Patent
Wu et al.

(10) Patent No.: US 7,843,943 B2
(45) Date of Patent: Nov. 30, 2010

(54) DIFFERENTIATION FOR BANDWIDTH REQUEST CONTENTION

(75) Inventors: Yi Wu, Beijing (CN); Yan Qun Le, Beijing (CN); Dong Mei Zhang, Beijing (CN)

(73) Assignee: Nokia Corporation, Espoo (FI)

( * ) Notice: Subject to any disclaimer, the term of this patent is extended or adjusted under 35 U.S.C. 154(b) by 160 days.

(21) Appl. No.: 12/046,408

(22) Filed: Mar. 11, 2008

(65) Prior Publication Data

US 2009/0129404 A1     May 21, 2009

(51) Int. Cl.
*H04L 12/56* (2006.01)

(52) U.S. Cl. .................. 370/395.42; 370/230; 370/468

(58) Field of Classification Search ........................ None
See application file for complete search history.

(56) References Cited

U.S. PATENT DOCUMENTS

| 6,385,168 | B1* | 5/2002 | Davis et al. | 370/230 |
| 6,459,687 | B1* | 10/2002 | Bourlas et al. | 370/328 |
| 6,674,750 | B1* | 1/2004 | Castellano | 370/354 |
| 2003/0206521 | A1* | 11/2003 | Qiao | 370/230 |
| 2005/0002375 | A1* | 1/2005 | Gokhale et al. | 370/347 |
| 2007/0237077 | A1* | 10/2007 | Patwardhan et al. | 370/230 |
| 2008/0144493 | A1* | 6/2008 | Yeh | 370/230 |

FOREIGN PATENT DOCUMENTS

| EP | 1608197 A1 | 12/2005 |
| EP | 1753188 A1 | 2/2007 |
| WO | 00/63307 A1 | 10/2000 |
| WO | 02/054671 A2 | 7/2002 |
| WO | 2004/100403 A1 | 11/2004 |
| WO | 2006/098688 A1 | 9/2006 |

OTHER PUBLICATIONS

"FI International Search Report", (Dec. 18, 2008),1-4.
"FI Written Opinion of the International Searching Authority", (Mar. 12, 2009),1-7.

* cited by examiner

*Primary Examiner*—Donald L Mills
(74) *Attorney, Agent, or Firm*—Brake Hughes Bellermann LLP

(57) ABSTRACT

The present disclosure relates to a method and an apparatus for bandwidth contention differentiation comprising: determining a service type of a bandwidth request, setting a priority of the bandwidth request based on the determined service type, and providing contention differentiation based on the set priority.

25 Claims, 2 Drawing Sheets

DIFFERENTIATION FOR BANDWIDTH REQUEST CONTENTION

PRIORITY CLAIM

This application claims the benefit of priority based on European Patent Office Application No. 7022596.1/EP07022596, filed on Nov. 21, 2007, entitled, "A differentiation method for bandwidth request contention," the disclosure of which is hereby incorporated by reference.

FIELD

The present disclosure relates to a method and an apparatus for optimization of bandwidth usage in wireless networks. More particularly, the present disclosure relates to a technique for improving the performance of services in wireless networks.

BACKGROUND

In recent years the need for and therefore the relevance of wireless communication has increased steadily. Nowadays wireless communication is an inherent part of all kinds of businesses as well as of the day to day communication. Accordingly, as the number of users connected has been multiplied over the past, the amount of data transmitted over wireless communication systems has also been multiplied, resulting in demands for higher capacity, higher data rate and multimedia services. Therefore, optimization of bandwidth usage within networks became an issue.

For example, the IEEE standard 802.16-2004 (IEEE Standard for Local and metropolitan area networks—Part 16: Air Interface for Fixed Broadband Wireless Access Systems), so called WiMAX standard, has been designed to satisfy various demands for higher capacity, higher data rate, and advanced multimedia services.

In order to support multimedia services with variable requirements of quality of service (QoS) a scheduling algorithm has to be provided. Particularly, an efficient uplink (UL) scheduling algorithm for voice services is required because voice services are delay sensitive and have an important portion within the multimedia services. As a technology for voice services in a packet oriented architecture, for example voice over IP (VoIP) technology can be utilized.

To support the variable requirements of QoS, various scheduling algorithms have been proposed, e.g. unsolicited grant service (UGS), a polling service for real-time, e.g. real-time polling service (rtPS), an extended polling service for real-time, e.g. extended real-time polling service (ertPS), a polling service for non-real-time, e.g. non-real-time polling service (nrtPS), best effort service (BE), etc. The unsolicited grant service, real-time polling service and extended real-time polling service algorithms are designed to support real-time services, while the non-real-time polling service and best effort service algorithms are designed to support non-real-time services.

A communication network comprises at least one base station (BS) and at least one subscriber station (SS). The BS is a generalized equipment set providing connectivity, management, and control of the subscriber station. The SS is a generalized equipment set providing connectivity between subscriber equipment and a base station.

In the IEEE standard 802.16 a contention resolution for the bandwidth request (BR) transmission in uplink channel is provided. In the sense of the application, uplink is the direction from a subscriber station to a base station. As contention resolution for a bandwidth request (BR) the following approach can be exemplarily selected. The BS controls assignments of bandwidth on the uplink channel through messages, e.g. UL-MAP messages, and determines which slots are subject to contentions. An UL-MAP is a set of information that defines the entire access for a scheduling interval. A method of contention resolution as proposed in the WiMAX standard is based on a truncated binary exponential backoff based on contention windows (CW), with the initial backoff window and the maximum backoff window controlled by the BS. The values of the CWs are specified as part of the UCD message and represent a power of 2 ($2^n$) value. For example, a value of 4 indicates a contention window between 0 and 15 ($2^4$); a value of 10 indicates a contention window between 0 and 1023 ($2^{10}$).

When a SS has information to send and wants to enter the contention resolution process, it sets its initial backoff window equal to the parameter request backoff start defined in a message for an uplink channel descriptor (UCD), referenced by the UCD Count in the UL-MAP message currently in effect. The UCD is a medium access control message that describes the physical layer (PHY) characteristics of an uplink. The parameter request backoff start is the initial backoff window size for contention bandwidth (BW) requests, expressed as a power of 2 ($2^n$) value.

Then the SS shall randomly select a number within its backoff window. This random number indicates the number of contention transmission opportunities that the SS shall defer before transmitting. After transmission of the information, the SS waits for an information element (IE) of the data grand burst type, e.g. data grant burst type IE in the subsequent UL-MAP message. The data grant burst type IEs provide an opportunity for an SS to transmit one of more uplink protocol data units (PDU). A PDU is a data unit exchanged between peer entities of the same protocol layer. These IEs are issued either in response to a request from a base/subscriber station, or because of an administrative policy, such as unicast polling, providing some amount of bandwidth to a particular base/subscriber station. Once the data grant burst type IE has been received, the contention resolution is complete.

The SS shall consider the contention transmission lost if no data grant burst type IE for this SS has been received in the subsequent UL-MAP messages. The number of the subsequent UL-MAP messages the SS analyzes is specified by the parameter Contention-based reservation timeout. The SS shall then increase its backoff window by a factor of two, as long as it is less than the maximum backoff window. The SS shall randomly select a number within its new backoff window and repeat the deferring process described above.

Among the above mentioned scheduling types, the unsolicited grant service and the real-time polling service are not allowed to use a method for contention resolution for bandwidth requests to reserve uplink resources. The unsolicited grant service is designed to support real-time data streams consisting of fixed-size data packets issued at periodic intervals, such as voice over IP services without silence suppression. The real-time polling service is designed to support real-time data streams consisting of variable-sized data packets that are issued at periodic intervals, such as video.

On the other hand, for the non-real-time polling service and best effort service, the Request/Transmission Policy setting shall be set such that the SS instead of the BS is allowed to use contention request opportunities. The non-real-time polling service is designed to support delay-tolerant data streams consisting of variable-sized data packets for which a minimum data rate is required, such as file transfer protocol (FTP). The best effort service is designed to support data streams for which no minimum service level is required and therefore may be handled on a space-available basis.

The extended real-time polling service has been designed to support real-time service flows that generate variable size data packets on a periodic basis, such as for example voice over IP services with silence suppression. The scheduling mechanism is built on the efficiency of both unsolicited grant service and real-time polling service. The BS shall provide unicast grants in an unsolicited manner like in unsolicited grant service, thus saving the latency of a bandwidth request. However, whereas the data packets of unsolicited grant service are fixed in size, the data packets of extended real-time polling service are variable in size.

In extended real-time polling service, the SS informs the BS of its voice status information using a grant management subheader in case that its data rate of the voice codec is decreased. According to the voice status, the BS can reduce the polling size. However, in case that a data rate of the voice codec is increased, the SS can not send the respective voice data packet by using assigned polling resources. The SS has first to request additional bandwidth prior sending the voice data packets using bandwidth request header. The BS may not change its polling size without any prior indication or request from the SS.

In conclusion, when collision of data packets or bandwidth requests occurs, the respective bandwidth request in contention may belong to extended real-time polling service, non-real-time polling service, best effort service, and also some medium access control layer (MAC) signalling messages such as handover. Unlike the non-real-time polling service and best effort service, the collision of bandwidth request for extended real-time polling service influences the speed of data rate, therefore decreasing the time-critical data flow, so that the QoS can not be guaranteed.

Accordingly, in the above mentioned scheduling types the problem remains that all bandwidth requests, irrespective of the utilized scheduling algorithm/service type (extended real-time polling service, non-real-time polling service, best effort service), are treated equally and therefore any QoS requirements for time-critical services can not be met.

SUMMARY

According to one general aspect, a method may comprise determining a service type of a bandwidth request, setting a priority of the bandwidth request based on the determined service type, and/or providing bandwidth contention differentiation based on the set priority.

According to another general aspect, an apparatus may comprise a processor configured to determine a service type of a bandwidth request, a processor configured to set a priority of the bandwidth request based on the determined service type, and/or a processor configured to provide bandwidth contention differentiation based on the set priority.

According to another general aspect, an apparatus may comprise means for determining a service type of a bandwidth request, means for setting a priority of the bandwidth request based on the determined service type, and/or means for providing bandwidth contention differentiation based on the set priority.

The priority of the bandwidth request can either be a high priority for time-critical requirements or a low priority for any other requirement. The priority is set to high priority when the bandwidth request belongs to extended real-time polling service. Additionally, the priority may also set to a high priority when the bandwidth request is for handover signalling which belongs to a SS with living time-critical connections. Accordingly, any handover latency can be reduced.

The priority is set to low priority when the bandwidth request belongs to the non-real-time polling service, best effort service or any other bandwidth request belonging to a service with a less latency limit.

Further, the contention differentiation can be configured to vary at least a parameter in a channel descriptor. The parameter can be a parameter defining a contention window (CW), e.g. for requesting start of backoff and/or for requesting end of backoff.

The parameter request backoff start is defined in UCD referenced by the UCD Count in the UL-MAP message currently in effect. A larger value of this parameter may result in smaller collision probability. However, the average delay of the contention success will be increased too. The SS is proposed to use the request backoff start defined in UCD as the initial backoff window for the bandwidth requests with low priority and to use a smaller initial backoff window, e.g. half of the request backoff start value defined in UCD, for the bandwidth requests with high priority. Currently, for simulation purposes, the default value for the parameter request backoff start is set to 3, i.e. the initial backoff window should be set to 2^3=8. However, it is also possible to set the parameter request backoff start to a value between 1, 2, 4 or 5.

The parameter request backoff end is defined in UCD referenced by the UCD Count in the UL-MAP message currently in effect and does also effect the contention success delay and collision probability as the parameter request backoff start. Therefore, the SS is proposed to use the request backoff end defined in UCD as the maximum backoff window for the bandwidth requests with low priority and to use a smaller maximum backoff window, e.g. half of the request backoff end value defined in UCD, for the bandwidth requests with high priority. Currently, for simulation purposes, the default value for the parameter request backoff end is set to 10, i.e. the initial backoff window should be set to 2^10=1024. However, it is also possible to set the parameter request backoff end to a value between 5, 6, 7, 8, 9 or 10.

Summarizing, high priority requests choose the backoff parameter from the lower half of the contention window. Therefore, high priority requests/high priority traffic has a smaller backoff interval than low priority requests/low priority traffic.

Still further, the contention differentiation can be configured to vary an algorithm for back-off. The SS can use the common truncated binary exponential backoff algorithm for a bandwidth requests with low priority, i.e. increasing its backoff window by a factor of two after collision. Further, for a bandwidth requests with high priority, the backoff algorithm can be changed for faster retrying, e.g. increasing its backoff window by a factor between 1 and 2, preferable 1.5 after collision.

Additionally, the contention differentiation can be configured to vary a timeout parameter according to the set priority. After contention transmission, the SS waits for a data grant burst type IE in a subsequent UL-MAP message. Once received, the contention resolution shall be assumed complete. The SS shall consider the contention transmission lost if no data grant burst type IE has been received within the number of subsequent UL-MAP messages specified by the parameter Contention-based reservation timeout. Therefore, for a bandwidth request with high priority, the timeout parameter should be set smaller than that for a bandwidth request with low priority. According to the default value specified by the IEEE standard 802.16, the preferable value for the reservation timeout parameter is 50 ms, i.e. 10 frames. However, it is also possible to set the reservation timeout parameter to a value between 20 ms and 100 ms, i.e. between 4 frames and 20 frames.

By setting a priority of the bandwidth request based on the determined service type the transmission efficiency can be improved, both for extended real-time polling services and time-critical signalling messages. This effect is achieved as the average delay to succeed in contention of a bandwidth request can be decreased. This holds especially true for extended real-time polling services and time-critical signalling messages compared to non-real-time polling services, best effort services and other non-real-time service types.

Additionally, the above described solution is advantageous, as the used format has not to be changed, but only the parameter configuration and the algorithm for contention resolution has to be altered.

Further advantageous developments are defined in the dependent claims.

BRIEF DESCRIPTION OF THE DRAWINGS

The present invention will now be described on the basis of preferred embodiments with reference to the accompanying drawings, in which.

DETAILED DESCRIPTION OF EMBODIMENTS

Figure 1:
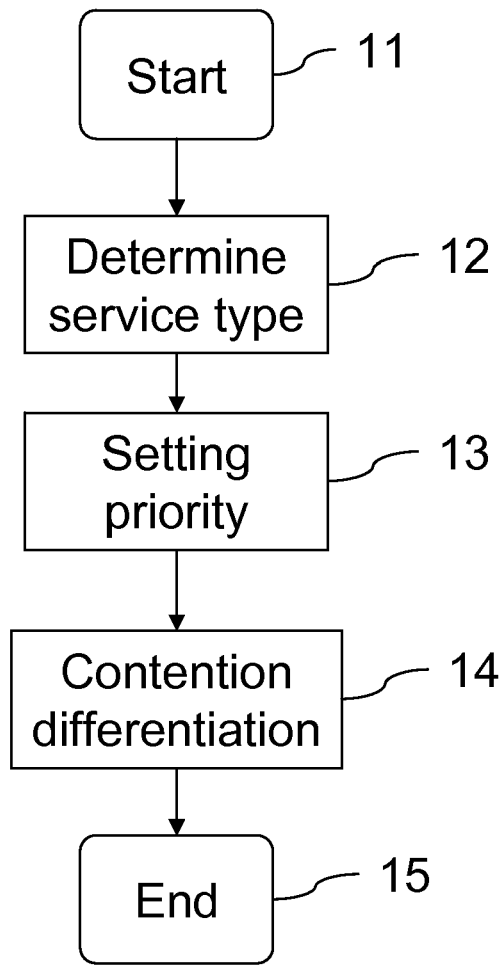
FIG. 1 shows an exemplary flowchart for a method for bandwidth contention differentiation.

FIG. 1 shows an exemplary flowchart for a method for bandwidth contention differentiation. After the method has been invoked in block 11, the method determines from a generated bandwidth request a respective service type in block 12. In block 13, based on the prior determined service type, a priority of the bandwidth request is set. The priority of the bandwidth request can either be a high priority for time-critical requirements or a low priority for any other (non time-critical) requirements. After having set the priority, contention differentiation is provided by block 14. The contention differentiation in block 14 is configured to vary at least a parameter in a channel descriptor. The varied parameter is the parameter defining a contention window (CW), e.g. for requesting start of backoff and/or for requesting end of backoff. After providing contention differentiation, the method ends at block 15.

In a further embodiment, the contention differentiation in block 15 is configured to vary an algorithm for back-off.

In a still further embodiment, the contention differentiation in block 14 is configured to vary a timeout parameter according to the set priority.

Figure 2:
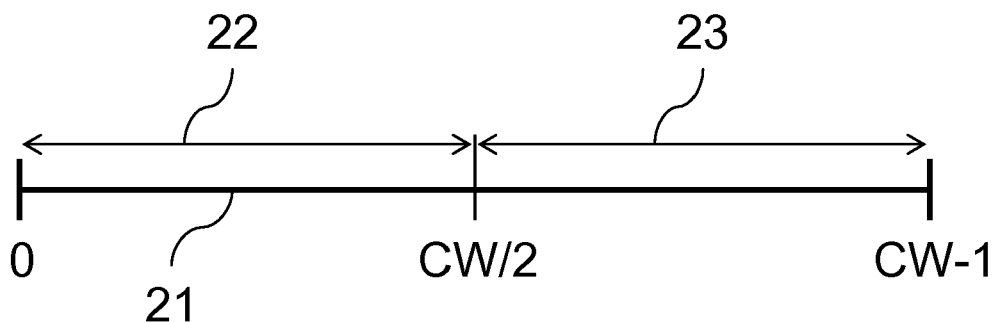
FIG. 2 shows different contention window ranges for different priorities.

In FIG. 2 different contention window ranges for different priorities are shown. Reference numeral 21 denotes the whole contention window $0-2^n-1$, wherein reference numeral 22 refers to the high priority range and reference numeral 23 refers to the low priority range. As one can see from FIG. 2, the high priority range 22 relates to the lower half, e.g. $0-CW/2-1$, of the contention window, whereas the low priority range 23 relates to the upper half, e.g. $CW/2-CW-1$, of the contention window. Therefore, high priority requests/high priority traffic may have a smaller backoff interval than low priority requests/low priority traffic.

Figure 3:
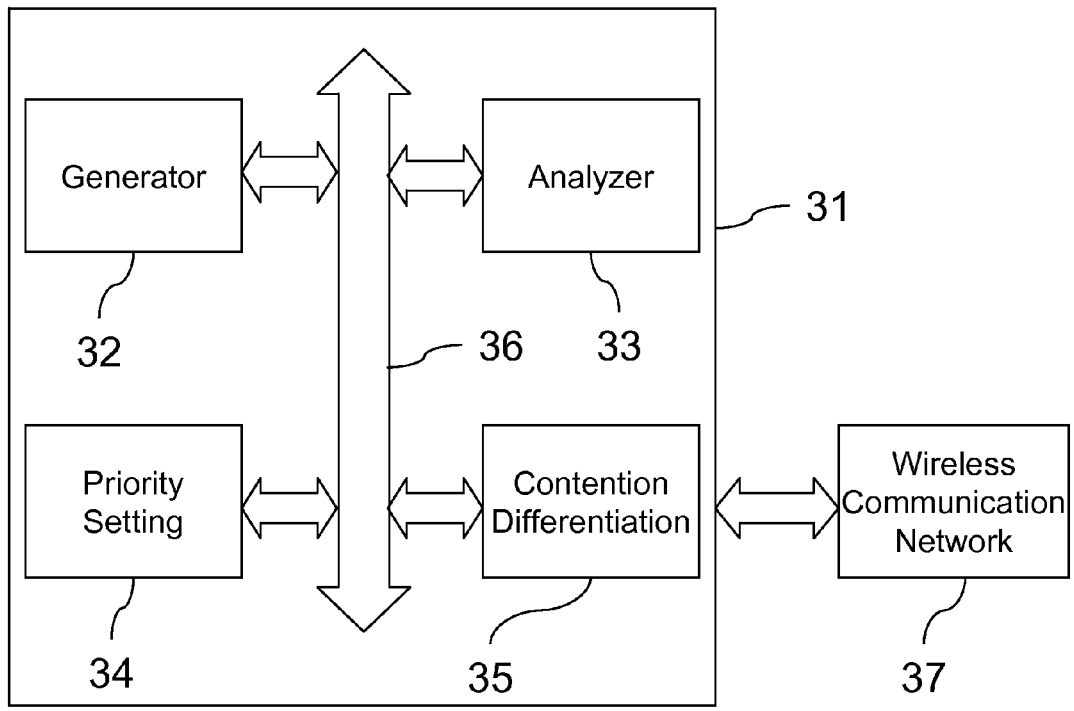
FIG. 3 shows a functional block diagram of an apparatus for bandwidth contention differentiation.

In FIG. 3 a functional block diagram of the apparatus 31 for bandwidth contention differentiation coupled to a wireless communication network 37 is shown. The apparatus 31 includes several functional blocks 32-35 interconnected by an interconnection 36. The functional blocks comprise a generator unit 32, an analyzer unit 33, a priority setting unit 34 and a contention differentiation unit 35. Functions of the blocks 32-35 can be implemented by hardware circuits, in which case, the interconnection 36 represents a communication bus for communication of the respective blocks. Alternately, one or more functions performed by the blocks 32-35 can be implemented by a processor operating according to a stored software program. The apparatus 31 can be constructed as a dedicated stand-alone unit or the apparatus 31 can be constructed by adding one or more circuit boards and software to an existing communication system. The apparatus 31 interconnects with the wireless communication network 37. As an additional option, the apparatus may be implemented as an integrated chip, a chip set or a module to be mounted into any type of device.

The apparatus 31 generates a bandwidth request at the generator unit 32. The generated bandwidth request is then transferred to and analyzed in the analyzer unit 33, wherein the service type of the bandwidth request is determined. After having determined the service type of the bandwidth request, the service type is transferred to the priority setting unit 34 and a respective priority is set. The set priority is then communicated to the contention differentiation unit 35, wherein contention differentiation is provided based on the set priority.

Figure 4:
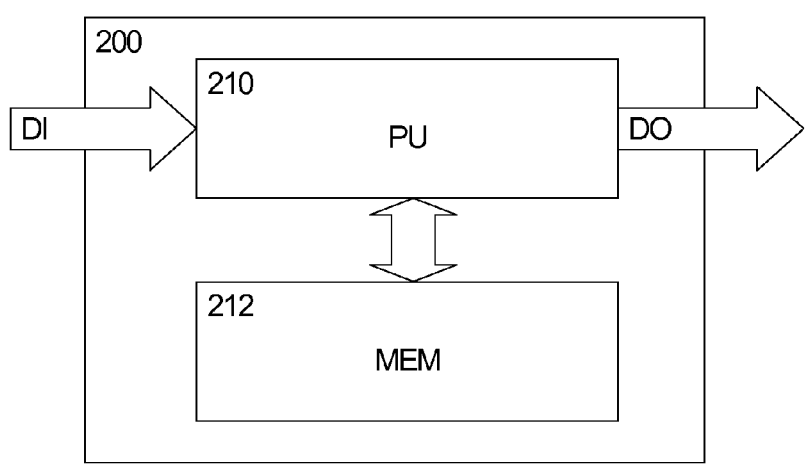
FIG. 4 shows a schematic block diagram of a software-based implementation according to an embodiment.

FIG. 4 shows a schematic block diagram of an alternative software-based implementation of the proposed apparatus 200 for bandwidth contention differentiation. Here, the proposed apparatus comprises a processing unit PU 210, which may be any processor or computer device with a control unit which performs control based on software routines of a control program stored in a memory MEM 212. Program code instructions are fetched from the memory 212 and are loaded to the control unit of the processing unit 210 in order to perform the processing steps of the above functionalities described in connection with the respective FIGS. 2 and 3. These processing steps may be performed on the basis of input data DI and may generate output data DO, wherein the input data DI may correspond to a bandwidth request and the output data DO may correspond to a contention differentiation output.

To summarize, a method and an apparatus for bandwidth contention differentiation have been described, wherein a service type of a bandwidth request is determined. A priority of the bandwidth request is set based on the determined service type, and bandwidth contention differentiation is provided based on the set priority.

It is noted that the proposed solutions according to the above embodiments can be implemented in software modules at the relevant functional blocks. It is further noted that the present invention is not restricted to the above embodiments but can be used in any network environment.

It will be apparent from the foregoing that, while preferred and exemplary embodiments have been illustrated and described, various modifications can be made without departing from the spirit and scope of the invention. Accordingly, it is not intended that the invention be limited by the detailed description of the preferred and exemplary embodiments.

Finally but yet importantly, it is noted that the term "comprising" when used in the specification including the claims is intended to specify the presence of stated features, means, steps or components, but does not exclude the presence or

The invention claimed is:

1. A method comprising:
   determining, by a processor, a service type of a bandwidth request,
   setting a priority of the bandwidth request to either a high priority or a low priority based on the determined service type, and
   providing bandwidth contention differentiation by providing a backoff interval in a lower portion of a contention window if the set priority is high priority and providing the backoff interval in an upper portion of the contention window if the set priority is low priority, based on the set priority.

2. The method according to claim 1, wherein the bandwidth contention differentiation includes varying a parameter in a channel descriptor.

3. The method according to claim 2, wherein the parameter is either a parameter for requesting start of backoff or a parameter for requesting end of backoff.

4. The method according to claim 1, wherein the bandwidth contention differentiation is configured to vary an algorithm for backoff.

5. The method according to claim 1, wherein the bandwidth contention differentiation is configured to vary a timeout parameter according to the set priority.

6. The method according to claim 1, wherein the service type of the bandwidth request is a real-time polling service, an extended real-time polling service or a standalone bandwidth request for a handover signalling.

7. An apparatus comprising:
   a processor configured to determine a service type of a bandwidth request
   a processor configured to set a priority of the bandwidth request to either a high priority or a low priority based on the determined service type, and
   a processor configured to provide bandwidth contention differentiation by providing a backoff interval in a lower portion of a contention window if the set priority is high priority and providing the backoff interval in an upper portion of the contention window if the set priority is low priority, based on the set priority.

8. The apparatus according to claim 7, wherein the processor configured to provide bandwidth contention differentiation is configured to vary a parameter in a channel descriptor.

9. The apparatus according to claim 8 wherein the parameter is either a parameter for requesting start of backoff or a parameter for requesting end of backoff.

10. The apparatus according to claim 7, wherein the processor configured to provide bandwidth contention differentiation is configured to vary an algorithm for backoff.

11. The apparatus according to claim 7, wherein the processor configured to provide bandwidth contention differentiation is configured to vary a timeout parameter according to the set priority.

12. The apparatus according claim 7, wherein the service type of the bandwidth request is a real-time polling service, an extended real-time polling service or a standalone bandwidth request for a handover signalling.

13. An apparatus comprising:
   means for determining a service type of a bandwidth request,
   means for setting a priority of the bandwidth request to either a high priority or a low priority based on the determined service type, and
   means for providing bandwidth contention differentiation by providing a backoff interval in a lower portion of a contention window if the set priority is high priority and providing the backoff interval in an upper portion of the contention window if the set priority is low priority, based on the set priority.

14. The apparatus according to claim 13, wherein the means for providing bandwidth contention differentiation is configured to vary a parameter in a channel descriptor.

15. The apparatus according to claim 13 wherein the parameter is either a parameter for requesting start of backoff or a parameter for requesting end of backoff.

16. The apparatus according to claim 13, wherein the means for providing bandwidth contention differentiation is configured to vary an algorithm for backoff.

17. The apparatus according to claim 13, wherein the means for providing bandwidth contention differentiation is configured to vary a timeout parameter according to the set priority.

18. The apparatus according claim 13, wherein the service type of the bandwidth request is a real-time polling service, an extended real-time polling service or a standalone bandwidth request for a handover signalling.

19. A computer memory comprising a program comprising program code means adapted to, when the program is run on a processor, perform:
   determining a service type of a bandwidth request,
   setting a priority of the bandwidth request to either a high priority or a low priority based on the determined service type, and
   providing bandwidth contention differentiation by providing a backoff interval in a lower portion of a contention window if the set priority is high priority and providing the backoff interval in an upper portion of the contention window if the set priority is low priority, based on the set priority.

20. The computer memory according to claim 19, wherein the bandwidth contention differentiation is configured to vary a parameter in a channel descriptor.

21. The computer memory according to claim 19, wherein the parameter is either a parameter for requesting start of backoff or a parameter for requesting end of backoff.

22. The computer memory according to claim 19, wherein the bandwidth contention differentiation is configured to vary an algorithm for backoff.

23. The computer memory according to claim 19, wherein the bandwidth contention differentiation is configured to vary a timeout parameter according to the set priority.

24. The computer memory according to claim 19, wherein the service type of the bandwidth request is a real-time polling service, an extended real-time polling service or a standalone bandwidth request for a handover signalling.

25. The method according to claim 1, wherein the bandwidth request is an IEEE 802.16 WiMAX bandwidth request.

* * * * *

UNITED STATES PATENT AND TRADEMARK OFFICE
CERTIFICATE OF CORRECTION

PATENT NO. : 7,843,943 B2 Page 1 of 1
APPLICATION NO. : 12/046408
DATED : November 30, 2010
INVENTOR(S) : Yi Wu et al.

It is certified that error appears in the above-identified patent and that said Letters Patent is hereby corrected as shown below:

In column 7, line 37, in claim 7, delete "request" and insert -- request, --, therefor.

Signed and Sealed this
Fifteenth Day of February, 2011

David J. Kappos
*Director of the United States Patent and Trademark Office*